June 13, 1961 W. K. CRANE 2,988,252
BASKET RACK FOR STATION WAGONS
Filed Feb. 3, 1958 2 Sheets-Sheet 1

INVENTOR.
WALTER K. CRANE
BY C. G. Stratton
ATTORNEY

June 13, 1961 W. K. CRANE 2,988,252
BASKET RACK FOR STATION WAGONS
Filed Feb. 3, 1958 2 Sheets-Sheet 2
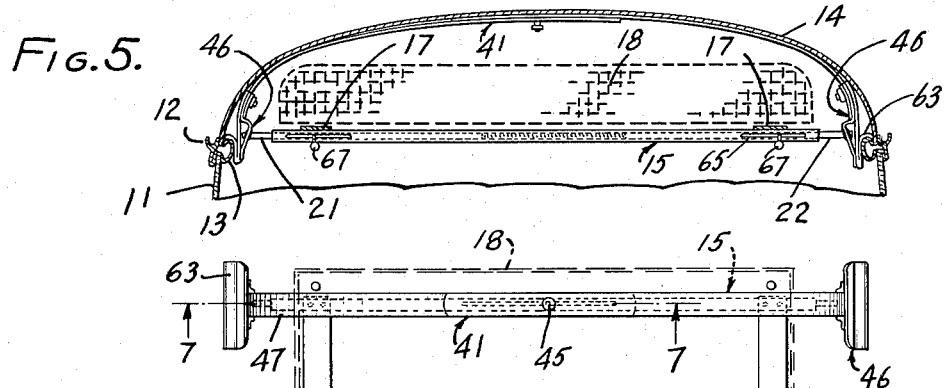
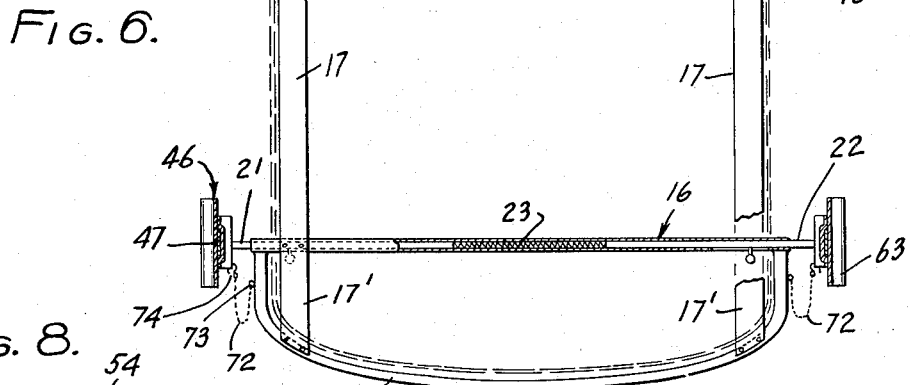
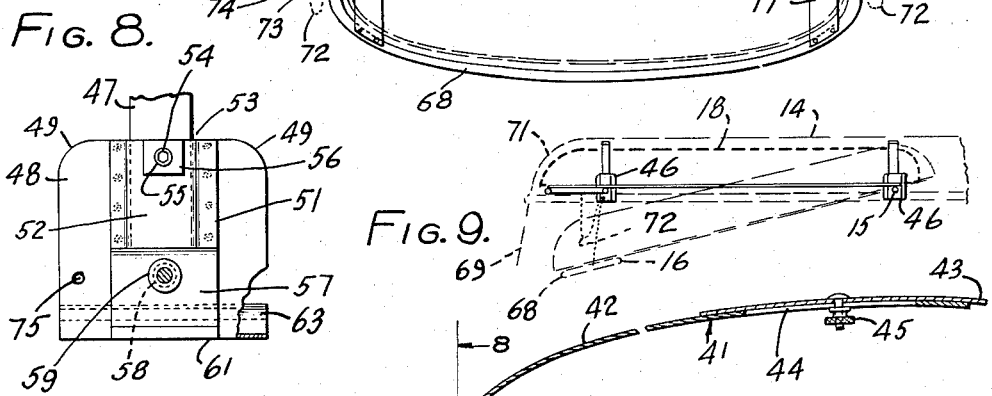
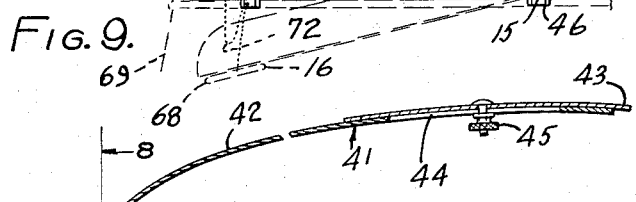
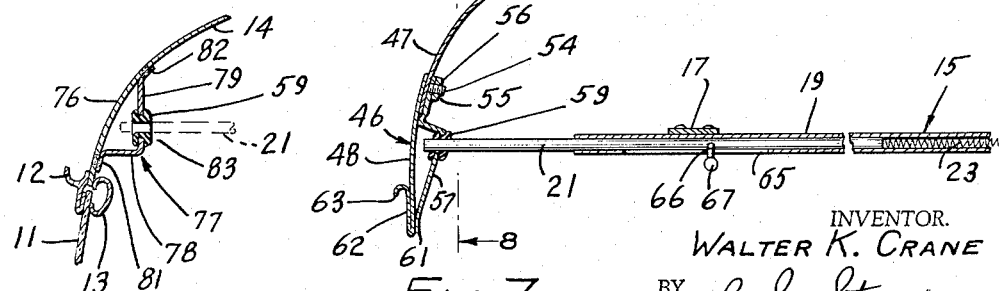
INVENTOR.
WALTER K. CRANE
BY C. G. Stratton
ATTORNEY

United States Patent Office 2,988,252
Patented June 13, 1961

2,988,252
BASKET RACK FOR STATION WAGONS
Walter K. Crane, Los Angeles, Calif.
(8305 2nd Ave., Inglewood 4, Calif.)
Filed Feb. 3, 1958, Ser. No. 713,033
4 Claims. (Cl. 224—42.1)

This invention relates to racks adapted to be mounted in vehicles, such as station wagons, or in other comparable locations.

An object of the invention is to provide a lightweight inexpensive durable structure for enabling equipment to be stored under the roof of vehicles such as station wagons.

A further object is to provide a rack structure which may be mounted in standard vehicles as delivered by automobile manufacturers without modification thereof, which may be removed readily when desired, and which may readily be lowered for stowage or removal of articles to be transported such as baggage, guns, fishing tackle, skis or sporting gear, salesmen's samples, or the like.

Still another object of the invention is to provide a fastening means for a vehicle rack which is secure and unaffected by road vibration but by means of which a connection may readily and easily be made without the use of tools.

Still another object of the invention is to provide a minor modification in construction of standard closed automotive vehicles to adapt them for easy and secure, detachable mounting of package or equipment-carrying racks.

Other and further objects, features, and advantages of the invention will become apparent as the description proceeds.

In carrying out the invention in accordance with a preferred form thereof, a framework is provided including telescopic tubes resiliently biased to spread into extended position, and metal straps are provided with elements at the end for receiving the ends of the telescoping tubes, having hooks for engagement with the garnish molding which is a part of the standard construction of automotive vehicles. The straps are adjustable to provide for different degrees of extension of the telescopic tubes as may be required for variations in size of different vehicles, as well as to provide for fitting of the straps closely against the roof of the vehicle so as to hold the garnish molding-engaging hooks securely in engagement and to insure that the rack will remain securely installed during the movement of the vehicle over uneven or rough roads.

A better understanding of the invention will be afforded by the following detailed description considered in conjunction with the accompanying drawings in which, FIG. 1 is a view of a section of an embodiment of the invention represented as cut by a vertical plane.

Figure 1:
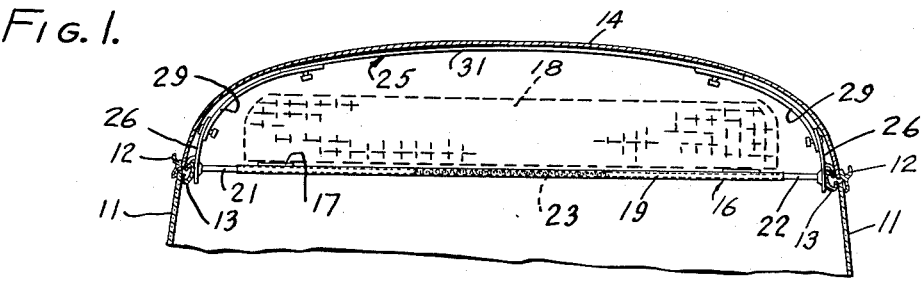

FIGS. 5, 6, 7, and 8 are views corresponding to FIGS. 1, 2, 3, and 4, respectively, of another embodiment of the invention.

FIG. 9 is a diagram illustrating the manner of manipulating the rack of FIGS. 1 to 8 when it is desired to stow away gear or remove it from the rack.

FIG. 10 is a detailed view of a modification which may be made in the construction of vehicles as furnished by automobile manufacturers to enable supporting racks of the type illustrated in FIGS. 1 to 9 to be installed when desired in such vehicles without employment of hooked adjustable brackets.

Like reference characters are utilized throughout the drawing to designate like parts.

As shown in FIG. 1, standard passenger cars and station wagons, as delivered by automobile manufacturers, are provided with windows illustrated fragmentarily at 11 having gutters 12 outside and garnish moldings 13 in the interior of a closed motor vehicle. The roof of such vehicles consists of formed sheet metal or a "turret top" with sound-proofing and a ceiling thereunder with a head liner of cloth material, the details of which are not shown, since this does not constitute a part of the present invention, the entire roof and ceiling unit being represented as a unitary part 14 with a curving or flat-arch contour.

Figure 2:
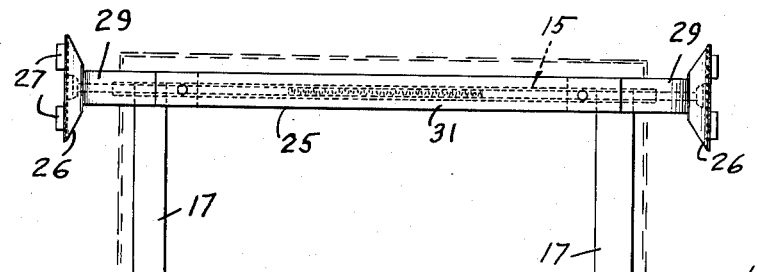
FIG. 2 is a plan view of the apparatus of FIG. 1 with a portion thereof broken away and shown in section to illustrate interior construction.

A removable rack is provided for mounting under the roof 14 and upon the garnish molding 13. As illustrated in FIG. 2, the rack comprises a pair of telescopic tube units 15 and 16 joined by bars 17 to form a framework for a luggage-carrying basket 18 or the like. It will be understood, however, that the invention is not limited to securing the basket 18 to the framework and does not exclude the use of suitable mounting brackets for guns, salesmen's samples, or the like secured to the bars 17 or to the tube units 15 and 16.

Although the invention is not limited to the use of circular cross section telescopic units, for the sake of illustration, the telescopic units are each shown as a tube 19 of less length than the interior width of the narrowest vehicle in which the apparatus is to be installed, receiving rods 21 and 22 axially movable in the tube 19 and outwardly biased to the spread or extended position resiliently by means of a compression spring 23 within the central portion of the tube 19. The bars 17 shown as flat strips are secured in any suitable manner as by means of rivets 24 to the tubes 19.

Figure 4:
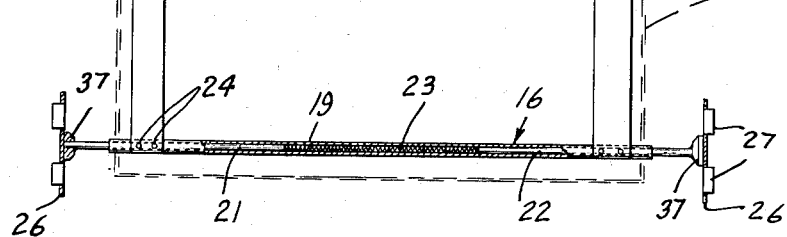
FIG. 4 is a fragmentary enlarged detail view of an end portion of the part shown in FIG. 3.
Figure 4:
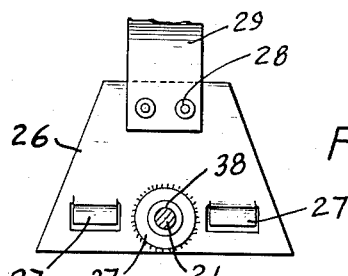
Figure 3:
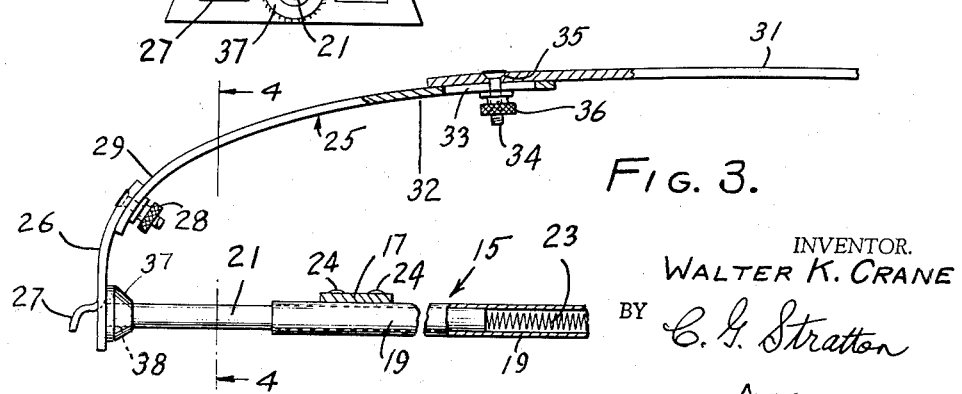
FIG. 3 is an enlarged fragmentary view of an end portion of the rack member of the apparatus of FIG. 1.

Cooperating with the telescopic units 15 and 16, straps 25 adjustable in length are provided having end elements 26 each formed with one or more hooks 27 adapted to fit over and engage the garnish molding 13. As illustrated in FIGS. 3 and 4, the strap end elements 26 may consist of trapezoidal sheet metal pieces with portions thereof struck out to form the hooks 27. In order to facilitate installation of the apparatus, especially if a limited degree of adjustability of the straps 25 is provided, the strap end elements 26 may be separate elements from the straps with suitable connecting means such as pairs of thumb screw units 28 for removably securing the ends 29 of the straps 25 to the strap end elements 26.

Preferably, adjustability of the straps 25 is provided by utilizing straps comprising components relatively movable longitudinally such as a center component 31 with end components 32, one or both of which is formed with an elongated slot 33 to receive a flat head screw 34 fitting a counter sunk hole 35 in the end of the center strip component 31 and provided with a knurled thumb nut 36, which may be tightened to secure the strap 25 in arch-form in the proper extending position and against the flat-arch shaped roof 14 of the vehicle after the installation has been made.

For connecting the telescopic units 15 and 16 with the strap end elements 26, the latter are formed with sockets adapted to receive the end rods 21 of the telescopic units 15 and 16. For example, in the embodiment of FIGS. 1 to 4, bushings 37 may be secured to the strap end element 26 by welding or the like, each having a socket 38 therein for receiving an end of the telescopic unit 15 or 16. Where it is desired to adapt the apparatus to different vehicles which may differ in the dimensions of the roof 14 above the garnish molding 13, the end strap components 32 may be composed of spring metal such as spring steel strips, for example, which may readily be bent to conform to the shape and height of the roof 14 of the vehicle in which the rack is installed. In this case, the center component members 31 and the strap end elements 26 may, if desired, be composed of relatively rigid material. The invention is not limited thereto and does not exclude the use of spring strip metal throughout to form the straps 25.

For example, as illustrated in FIGS. 5 to 8, a strap 41 may be utilized having two components or segments 42 and 43 each composed of spring steel strip, one of them having an elongated slot 44 for cooperation with thumb screw unit 45. In this case, the entire adjustability and adaptability of the strap 41 to the dimensions both transverse and vertical of the interior of the vehicle in which the rack is to be mounted will be accomplished by the flexibility of the strap 41 and the extensibility provided by the elongated slot 44. It will be understood that suitable guides not shown may be provided if desired for maintaining alignment of the strap components 42 and 43.

When employing the spring strip straps 41 of the type illustrated in FIGS. 5 to 8, preferably strap end elements 46 are provided which have rectangular sockets therein for receiving the ends 47 of the flexible spring strip strap 41. For example, as shown in FIG. 8, the strap end element 46 may be composed of a sheet metal member 48 shown as approximately rectangular in form with rounded corners 49 having a piece 51 secured thereto in any suitable manner as by spot welding, the piece 51 having been pressed to the shape shown in a suitable die to form a channel 52 which in conjunction with the surface of the plate 48 forms a flat rectangular socket 53 for receiving the strap end 47. In order to secure the assembly after the installation has been made, set screws 54 are preferably provided adapted to be threaded into a hole 55 formed in the upper end of the piece 48 and preferably also in a reinforcing block 56 welded or otherwise secured thereto.

In order to provide a relatively inexpensive, compact easily manufactured assembly, the piece 51 preferably is formed with a lower extension 57 bent as shown to be spaced from the plate 48 having a hole 58 therein preferably provided with a grommet 59 of resilient material for receiving the telescopic unit end rod 21. Preferably the lower edge 61 of the piece 51 is also welded or otherwise secured to the lower edge of the plate 48. The latter may be bent as shown with a portion 62 bent back against the plate 48 and an edge curved back to form a lip 63 serving as a garnish molding engaging hook.

In order to retain the end rods 21 of the telescopic units 15 and 16 and facilitate adjustment of the length of the telescopic units when an installation is made or the apparatus is to be demounted, the tubes 19 are preferably provided with slots 65 near the ends thereof, and the rods 21 have transverse pins 66 secured therein with enlarged ends 67 to form handles for contracting the telescopic units when desired. If desired, the framework for supporting the basket 18 may be extended to utilize all of the space at the rear end of the station wagon by securing bows 68 to the ends of the rod 19 of the rear telescoping unit 16 as shown in FIG. 6 and correspondingly extending bars 17 to form end elements 17' also secured to the bows 68.

Normally, after an installation has been made, the forward telescoping unit 15 will remain in place as shown in FIGS. 1 and 5 so long as the rack remains installed in the vehicle, but the rear telescoping unit 16 will be contracted when it is desired to lower the rear end of the rack to the position shown in dashed lines in FIG. 9 for enabling equipment to be placed upon the rack or removed therefrom after the rear window 69 of the station wagon has been raised in the conventional manner. When the rack is in the upward position illustrated in FIGS. 1 and 5, and by heavy dashed lines in FIG. 9, the curved permanently closed rear portion 71 of the station wagon roof 14 provides a closure for the rack or basket thereon, which guards against loss of any equipment being carried therein. Suitable means for limiting the downward movement of the rack are provided, such as chains 72 secured at one end to the rack, for example, to rings 73 attached to the bow 68 and removably secured by means of hooks 74 or the like adapted to engage openings 75 formed in the plate 48 of the strap end element 46.

It will be understood that when the initial installation is made, the straps 25 or 41 are first placed in position under the roof of the station wagon with the hook 27 or 63 engaging the garnish molding 13, and the straps are extended sufficiently to make a tight fit, whereupon they are secured by means of the thumb screw elements 36 or 45, the end securement having been accomplished by tightening the thumb screw 28 or the set screw 54. In the arrangement of FIGS. 5 to 7 owing to the flexibility of the strap components 42 and 43, the strap ends 47 may be secured in the strap end elements 46 by the set screws 54 initially when the unit leaves the factory, and no further attention thereto is required during the installation.

After the straps have been installed in place a distance apart corresponding to the distance apart of the telescopic units 15 and 16, the forward telescopic unit 15 is first mounted by retracting the ends by means of the handle 67 so that the rods 21 may be inserted in the sockets in the strap end elements whereupon the forward telescoping unit 15 serves as a pivot for the rack. The rear telescopic unit 16 is then readily mounted by retracting the ends by means of the handle 67. Once the initial installation has been made with the straps the proper distance apart in the vehicle, lowering and raising of the rear end of the rack is a simple operation since the end rods 21 are automatically guided into the grommets 59, the sloping lower portions 57 serving to aid in contracting the telescopic unit.

A luggage-carrying rack for motor vehicles has been disclosed which may readily be installed or removed in a standard motor vehicle having a garnish molding. The invention is not limited, however, to means for fitting such a rack into a standard motor vehicle, but comprehends also the provision of a motor vehicle with fittings at the factory for receiving a readily installed and demounted luggage rack under the roof of the vehicle. For example, as illustrated in FIG. 10, the lower side portion 76 of the vehicle roof 14 above the side window 11 may be provided with a permanently installed L-shaped fitting or bracket 77 which is so inexpensive that it may be provided as standard equipment in automobiles with the removable luggage rack described being optional equipment supplied only to those customers who desire it.

As shown the fitting 77 has a horizontal leg 78 and a vertical leg 79 each with feet 81 and 82 respectively secured in a suitable manner as by spot welding to the roof part 76 or metallic framework associated therewith. The vertical leg 79 of the bracket 77 has an opening 83 with a substantially horizontal axis adapted to receive the grommet 59 of FIG. 7 to form a noiseless socket as in the embodiment of FIG. 7 for receiving the rod end 21. It will be understood that when the luggage mounting bracket 77 of FIG. 10 is provided in the motor vehicle, four such brackets will be mounted therein corresponding to the strap end elements 46 of FIGS. 5 to 8.

While the foregoing specification illustrates and describes what I now contemplate to be the best modes of carrying out my invention, the constructions are, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. A fitting for a vehicle having a garnish molding under sides of a roof for supporting on said molding a luggage rack of a type having arch-forming straps to fit under a vehicle roof and rack-supporting telescoping tube units with retractable rod ends, said fitting comprising a trapezoidal sheet metal plate with a longer edge and a narrower edge parallel thereto, said plate having a pair of portions spaced from the longer edge struck out and bent to form molding-engaging hooks, a bushing secured to the plate between said hooks for receiving a retractable rod end, and means along the narrower edge of the plate for securement to an arch-forming strap.

2. A fitting for a vehicle having a garnish molding under sides of a roof for supporting on said molding a luggage rack of the type having arch-forming flat end sheet metal straps to fit under a vehicle roof and rack-supporting telescoping tube units with retractable rod ends, said fitting comprising a substantially rectangular sheet metal member having an upper edge, a channel piece welded thereto along the upper edge to form a flat rectangular socket open at the upper end for receiving an end of an arch-forming strap, the channel piece having a lower extension bent in L-form, spaced from the sheet metal member, with a lower edge welded to the sheet metal member, and a hole in the spaced portion for receiving a telescopic rod end, the sheet metal member having a lower portion bent up and back upon itself with an upper edge curved back to form a lip serving as a garnish molding engaging hook.

3. In a luggage rack for mounting on the garnish molding at the sides under the roof of a closed vehicle, said rack, at each of its forward and rearward ends, having a transverse strap arch adjustable in length to fit under said roof with the opposite ends of each arch downwardly directed and having two transverse and longitudinally spaced and connected rack-carrying telescoping tube units with retractable rod ends that are oppositely horizontally directed, the improvement that comprises fittings at each side of the rack, means embodied in each fitting detachably connected with the mentioned ends of the strap arch, a horizontal socket in each fitting disposed below the mentioned arch-connecting means thereof and in approximate vertical alignment therewith, said sockets being engaged by the mentioned rod ends of said tube units, and hook means on each fitting and disposed on the outer side of each fitting and adapted to have hooking engagement with garnish molding above mentioned to support the rack in the vehicle.

4. In a luggage rack according to claim 3, the mentioned arch-connecting means comprising an upwardly directed socket to receive the ends of the strap arch, and a securing element fixedly holding each arch end in its respective socket.

References Cited in the file of this patent

UNITED STATES PATENTS

| | | |
|---|---|---|
| 393,975 | Gordon | Dec. 4, 1888 |
| 1,116,039 | Dunham | Nov. 3, 1914 |
| 1,726,257 | Carlisle | Aug. 27, 1929 |
| 1,913,835 | Golike | June 13, 1933 |
| 2,253,423 | Fellers et al. | Aug. 19, 1941 |
| 2,478,337 | Strasser et al. | Aug. 9, 1949 |
| 2,528,794 | Seidler | Nov. 7, 1950 |
| 2,599,824 | Griffin | June 10, 1952 |
| 2,608,420 | Eck | Aug. 26, 1952 |